United States Patent [19]

Polley

[11] 4,130,346

[45] Dec. 19, 1978

[54] SUPER IMPOSED FRESNEL LENSES FOR CHANNEL INDICATORS

[75] Inventor: Eugene J. Polley, Lombard, Ill.

[73] Assignee: Zenith Radio Corporation, Glenview, Ill.

[21] Appl. No.: 839,042

[22] Filed: Oct. 3, 1977

[51] Int. Cl.² ............................................. G02B 27/02
[52] U.S. Cl. ..................................... 350/114; 350/211
[58] Field of Search ............... 350/114, 211, 202, 243, 350/162 ZP; 358/255, 254

[56] References Cited

U.S. PATENT DOCUMENTS

| 2,460,051 | 1/1949 | Welch | 350/114 |
| 2,588,373 | 3/1952 | Erban | 350/211 |
| 2,601,841 | 7/1952 | Zindel | 358/254 |
| 3,409,347 | 11/1968 | Vogel | 350/211 |
| 3,661,385 | 5/1972 | Schneider | 350/211 |
| 3,971,240 | 7/1976 | Love | 358/254 |
| 4,012,127 | 3/1977 | Bolander | 350/114 |
| 4,051,535 | 9/1977 | Inglish | 358/255 |

Primary Examiner—John K. Corbin
Attorney, Agent, or Firm—Nicholas A. Camasto

[57] ABSTRACT

A lens system for magnifying the images of an illuminated one of the channel indicators in a television receiver includes a transparent plate located adjacent the channel indicators and bearing a plurality of fresnel lenses. Each such lens is in optical alignment with an associated channel indicator and is disposed relative to adjacent lenses such that segments of adjacent lenses partially overlap on the transparent plate. The area of overlap between adjacent lenses is time-shared for magnifying a portion of the images associated with adjacent channel indicators.

10 Claims, 3 Drawing Figures

SUPER IMPOSED FRESNEL LENSES FOR CHANNEL INDICATORS

BACKGROUND OF THE INVENTION

This invention relates generally to television receivers having illuminated channel indicators, and is specifically directed to a lens system for magnifying the image of an illuminated channel indicator.

Television receivers commonly include a number of channel indicators, usually in the form of numerals, for indicating the channel number to which the receiver is tuned. Frequently, the channel indicator is illuminated.

Many types of indicating systems are in use. Those with the channel members "on-the-knob" and those providing a common area for display of the selected channel number are not involved here. The present discussion is restricted to so-called limited channel receivers of either the push button or remote type.

Most limited channel television receivers provide an elongated space on the front of the receiver for the channel indicators. Space is at a premium and the indicators must be made small which results in many viewers experiencing difficulty in reading them. This problem is particularly acute with remote control receivers where receiver adjustment is effected at viewing distance.

A lens could be disposed over each indicator to magnify the illuminated number for easier reading. The lens would need an area greater than the size of the channel indicator to achieve magnification and a plurality of such lenses would require as much space as enlarged indicators would, thus defeating the purpose.

OBJECTS OF THE INVENTION

It is a general object of the invention to provide an improved channel indicator system for a television receiver.

It is a more specific object of the invention to provide a space saving channel indicator lens system for a television receiver.

SUMMARY OF THE INVENTION

Broadly stated, the lens system described herein magnifies the image of an illuminated one of a plurality of closely spaced channel indicators by means of a transparent plate disposed adjacent the channel indicators and a plurality of substantially coplanar fresnel lenses disposed on the plate, each such lens located in optical alignment with an associated channel indicator. To achieve the requisite magnification yet reduce the space required for the lenses, the lenses are individually larger than their associated channel indicators but are disposed relative to each other such that adjacent lenses partially overlap each other, thereby reducing the total space required for the lenses. Magnification of the image of a channel indicator is achieved because the effective lens area of each lens includes that area of the plate occupied solely by an individual lens in addition to the overlapping area between adjacent lenses.

BRIEF DESCRIPTION OF THE DRAWINGS

The above and other objects of the invention are more particularly set forth in the following detailed description and in the accompanying drawings of which.

DESCRIPTION OF THE PREFERRED EMBODIMENT

Figure 1:
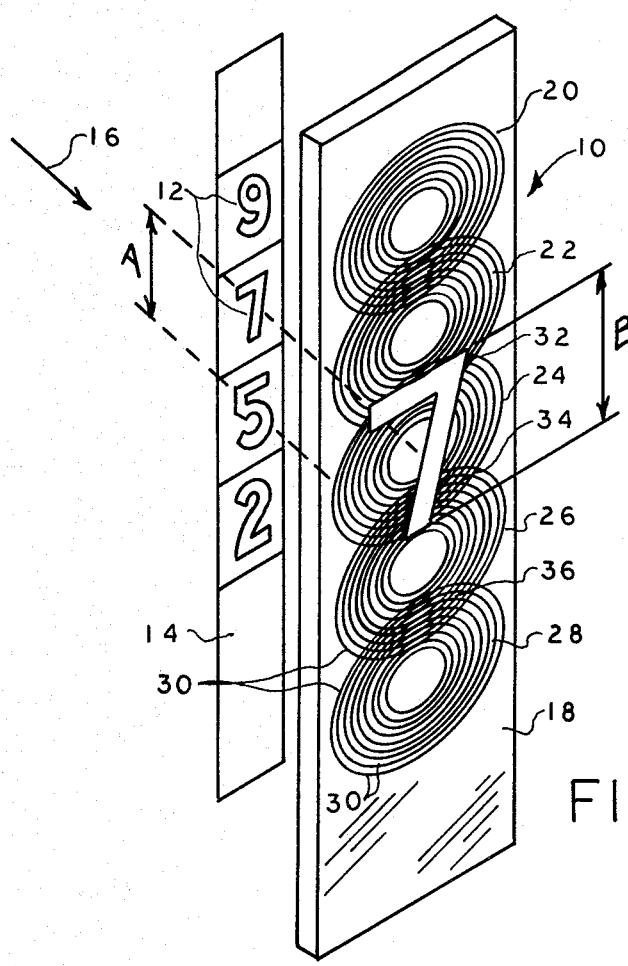
FIG. 1 illustrates an array of channel indicators and a lens system in accordance with the invention for magnifying an illuminated channel indicator.

Referring now to FIG. 1, there is shown a lens system 10 for magnifying the images of a plurality of channel indicators 12. The indicators 12 are conventionally disposed in-line as shown on a planar strip 14. A corresponding plurality of lamps (not shown) are conventionally mounted behind strip 14 for selectively illuminating the indicator representative of a received television channel. As illustrated, channel 7 is being received and light from the lamp associated therewith is directed onto channel numeral 7 in the direction of the arrow 16. The remaining channel indicators are illuminated by their respective lamps only when a correspondingly numbered television channel is received.

Lens system 10 includes a transparent plate 18 disposed adjacent to and in a plane substantially parallel to the plane of channel indicators 12. Disposed on plate 18 are a plurality of circular "in-line" fresnel lenses 20, 22, 24, 26 and 28, each in optical alignment with a respective one of channel indicators 12. For example, lens 24 is in optical alignment with channel indicator 7 and, when that indicator is illuminated, lens 24 magnifies its image as shown.

Each of lenses 20-28 is a conventional fresnel lens in that each includes a concentric series of simple lens sections. These sections are formed of a series of concentric grooves 30 having the usual saw-tooth type cross-section for bending light toward a common focal point. The cut of an inner groove of a lens will vary from the cut of the outermost concentric grooves in a well known manner for bending the light toward the common focal point.

In order to magnify the image associated with the indicators, each lens has a diameter greater than the largest dimension of its associated indicator. For example, lens 24 has a diameter B which is substantially larger than the largest dimension A of the channel 7 indicator. Each of the other lenses may have diameters equal to that of lens 24.

It has been found that magnification of the channel indicator images may be effected in a reduced overall lens space by disposing the lenses in the partially overlapping arrangement shown. Note that the centers of adjacent lenses are separated by a distance which is less than the diameter of their outermost grooves. For example, outermost grooves 30 of lens 24 overlap those of lens 22 in common area 32. In addition, the outermost grooves of lens 24 also overlap those of lens 26 in common area 34. Thus, lenses 22 and 24 share a common area 32 and lenses 24 and 26 share a common area 34. The remaining lenses share similar common areas as shown.

The effect of adjacent lenses sharing common areas is that the lens magnifies the image of its associated channel indicator over the area of plate 18 which it occupies alone, in addition to the area commonly occupied with adjacent lenses. For example, lens 24 is shown magnifying numeral 7 over its entire diameter B even though areas 32 and 34 are commonly occupied with lenses 22 and 26, respectively. When channel indicator 5 is illuminated, lens 26 magnifies its image 5 over its entire diameter including common area 34 and another common area 36, the latter of which is shared with lens 28. In effect, the common areas such as 32, 34, 36 are time-shared among the lenses thus reducing the overall space required on plate 18. Consequently, plate 18 may have the same length as strip 14, yet produce magnified images of the illuminated channel indicators to the extent of the overlap between adjacent lenses. Preferably, the amount of overlap between adjacent lenses is such that the magnified image is approximately twice the size of the channel numeral.

The overlapping grooves of adjacent lenses may take several forms, one of which is illustrated in FIG. 1. As shown, the grooves of adjacent lenses actually intersect each other in the common areas of overlap. As a result, area 34, for example, includes segments of lenses 24 and 26, with no substantial discrete portion thereof being solely associated with one lens. Consequently, the portion of an image magnified by common area 34 will not be as bright as the portion magnified in the non-overlapping areas of the lens. More specifically, the center portion of magnified numeral 7 will be brighter than its top and bottom portions (those magnified in areas 32 and 34). Nevertheless, a usable magnified image is obtained.

In producing lens system 10, transparent plate 18 may be made of any suitable transparent plastic material. Its thickness is not critical. The lenses may be formed in plate 18 in the manner in which the grooves of conventional plastic phonograph records are formed. That is, the lens sections may be molded into the surface of the plate. The number of concentric grooves associated with each lens may be varied, but from 100 to 200 grooves per inch produces a well defined image.

Figure 2:
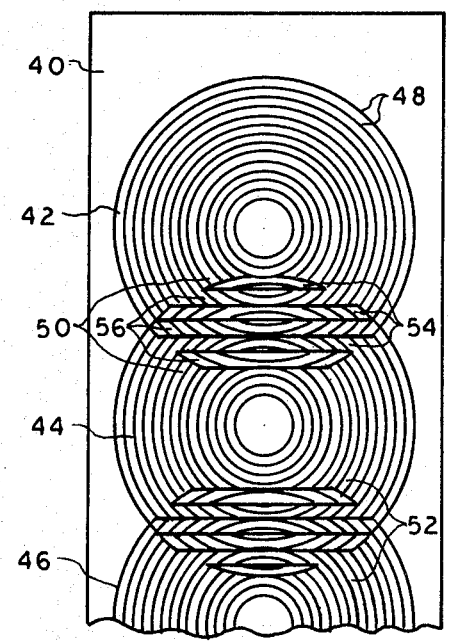
FIG. 2 illustrates an alternate embodiment of a lens system according to the invention.

Referring now to FIG. 2, there is shown an alternate embodiment of the lens system wherein the grooves of adjacent lenses are interleaved rather than intersecting. Fresnel lenses 42, 44 and 46 are disposed on a transparent plate 40 "in-line" with each other and in optical alignment with channel indicators such as indicators 12 of FIG. 1. Each lens includes grooves 48, concentric about their centers similar to the arrangement of FIG. 1.

Lenses 42 and 44 overlap in a common area 50, and lenses 44 and 46 overlap in another common area 52. However, the overlapping which exists in common areas 50 and 52 occurs as a result of interleaving the grooves of one lens with the grooves of an adjacent lens to form discrete adjacent bands, each band including only grooves associated with a single lens. For example, lenses 42 and 44 interleaving results in a set of bands 54 which include only grooves of lens 44. Similarly, a set of bands 56 are formed which include only grooves associated with lens 42. Band sets 54 and 56 are interleaved with each other such that grooves associated with lens 42 are in one set and grooves associated with lens 44 are in the other set. Similar interleaving between the grooves of lenses 44 and 46 occurs in common area 52.

This interleaving of grooves of adjacent lenses enhances the brightness of a magnified image in the overlap areas as compared to the brightness obtained in the overlap areas of FIG. 1. In other respects, operation of the lenses of FIG. 2 is identical to operation of the lenses of FIG. 1.

Figure 3:
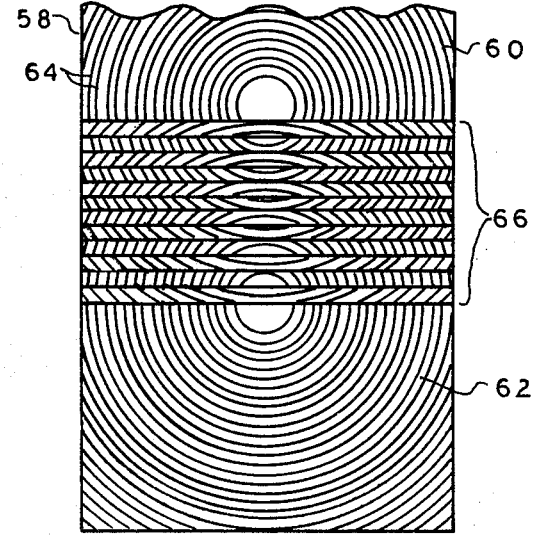
FIG. 3 illustrates an alternate embodiment of the lens system shown in FIG. 2.

Referring now to FIG. 3, there is shown a portion of a transparent plate 58 on which a pair of fresnel lens 60 and 62 are disposed "in-line" along the length of a transparent plate 58. The number of concentric grooves 64 of the lenses is increased and the lenses extend the full width of plate 58. In addition, a common area 66 is included where the grooves of lenses 60 and 62 are interleaved as described in FIG. 2.

Extension of the lenses to the full width of plate 58 yields a greater viewing angle. Hence, an image magnified by lenses 60 and 62 is somewhat easier to read. While only two lenses and one overlap area are shown, it is understood that more lenses would ordinarily be used with overlap areas occurring between adjacent lenses, as shown in FIG. 2. The improvement in viewing obtained with the embodiment of FIG. 2 may also be obtained with the FIG. 2 lenses by extending them to the full width of plate 40.

The lens systems of FIGS. 2 and 3, may be molded as described with reference to FIG. 1. However, the actual mold is not as easily formed for the interleaved embodiment (FIGS. 2 and 3) as it is for the intersecting embodiment (FIG. 1). The mold for the embodiment of FIG. 1 may be merely etched or cut with concentric grooves. For the embodiments of FIGS. 2 and 3, the mold may be formed of brass sections having etched or cut grooves. To form the overlapping sections, alternate bands of one lens may be cut out and interleaved with alternate bands of an adjacent lens. The final mold will then have only the alternate bands of adjacent lenses to form the patterns shown in FIGS. 2 and 3.

The lens systems described above all provide easier viewing of channel indicators due to their magnification of the image of an illuminated channel indicator. In addition, the plate on which the lenses are formed need be no larger than the strip on which the channel indicators are mounted because adjacent lenses time-share their overlapping areas. Thus, the lenses may be thought of as being compressed into a smaller area than heretofore possible.

Although the invention has been described in terms of specific embodiments, it will be obvious to one skilled in the art that various modifications and alterations may be made thereto. Accordingly, it is intended that all such modifications and alterations be included within the spirit and scope of the invention as defined by the appended claims.

What is claimed is:

1. For use in a television receiver having an array of closely spaced channel indicators disposed in a substantially common plane and having means for illuminating the channel indicator which identifies a received television signal, a lens system for magnifying the image of the illuminated channel indicator, comprising:
   a transparent plate disposed adjacent to and in a plane substantially parallel to the plane of the channel indicators; and
   a plurality of substantially coplanar circular fresnel lenses disposed on said plate, each such lens being located in optical alignment with, and having a diameter greater than the largest dimension of, its associated channel indicator,
   said lenses being disposed relative to each other such that adjacent lenses partially overlap each other, whereby the effective lens area over which the image of an illuminated channel indicator is magnified includes the overlapping areas of adjacent lenses, thus increasing the extent of magnification of an image and reducing the total amount of space required on said plate for said lenses.

2. A lens system as set forth in claim 1, wherein the channel indicators are arranged in-line, wherein each lens is in the form of a plurality of grooves concentric about the lens center, and wherein the centers of the respective lenses are disposed in-line in a plane parallel to the plane of the channel indicators.

3. A lens system as set forth in claim 2, wherein the grooves of adjacent lenses intersect each other in their area of overlap.

4. A lens system as set forth in claim 2, wherein at least the outermost grooves of adjacent lenses are interleaved with each other.

5. A lens system as set forth in claim 4, wherein the grooves of adjacent lenses are interleaved so as to define a plurality of adjacent lens bands, each such band including only the grooves of one lens.

6. A lens system as set forth in claim 5, wherein the grooves included within one band are those of one of the adjacent lenses and the grooves included in adjacent bands are those of the other of the adjacent lenses.

7. A lens system as set forth in claim 2, wherein the diameter of each lens is greater than the largest dimension of a channel indicator and the centers of adjacent lenses are separated by a distance which is less than the diameter of their outermost grooves.

8. For use in a television receiver having an array of channel indicators disposed in-line and closely spaced to each other in a substantially common plane, and having means for illuminating the channel indicator which identifies a received television signal, a lens system for magnifying the image of the illuminated channel indicator, comprising:
a transparent plate disposed adjacent to and in a plane substantially parallel to the plane of the channel indicators; and
a plurality of adjacent circular fresnel lenses disposed on said plate, each such lens being located in optical alignment with its associated channel indicator and being defined by a plurality of grooves concentric about the lens center, with the centers of the lenses disposed in-line in a plane substantially parallel to the plane of the channel indicators, adjacent lenses partially overlapping each other such that at least their outermost grooves intersect each other, whereby the effective lens area over which the image of an illuminated channel indicator is magnified includes the overlapping areas of adjacent lenses, thus increasing the extent of magnification of an image and reducing the total amount of space required on said plate for said lenses.

9. For use in a television receiver having an array of channel indicators disposed in-line and closely spaced to each other in a substantially common plane, and having means for illuminating the channel indicator which identifies a received television signal, a lens system for magnifying the image of the illuminated channel indicator, comprising:
a transparent plate disposed adjacent to and in a plane substantially parallel to the plane of the channel indicators; and
a plurality of adjacent circular fresnel lenses disposed on said plate, each such lens being located in optical alignment with its associated channel indicator and being defined by a plurality of grooves concentric about the lens center, with the centers of the lenses disposed in-line in a plane substantially parallel to the plane of the channel indicators, adjacent lenses partially overlapping each other such that at least their outermost grooves are interleaved with each other to define a plurality of adjacent lens bands, each one of which includes only the grooves of one lens, whereby the effective lens area over which the image of an illuminated channel indicator is magnified includes the overlapping areas of adjacent lenses, thus increasing the extent of magnification of an image and reducing the total amount of space required on said plate for said lenses.

10. A lens system as set forth in claim 9, wherein said plate has a predetermined length and width, said lenses are disposed in-line along the length of said plate and the grooves of each lens extend to the width of said plate.

* * * * *